United States Patent [19]

Hamakawa et al.

[11] Patent Number: 4,814,921

[45] Date of Patent: Mar. 21, 1989

[54] MULTILAYERED MAGNETIC FILMS AND THIN-FILM MAGNETIC HEADS USING THE SAME AS A POLE

[75] Inventors: Yoshihiro Hamakawa, Kokubunji; Kazuo Shiiki, Tsukui; Yoshihiro Shiroishi, Hachioji; Isamu Yuitoo, Hachioji; Hitoshi Numasaka Hachioji; Noriyuki Kumasaka, Ome; Shigekazu Otomo, Sayama; Eijin Moriwaki, Hachioji, all of Japan

[73] Assignee: Hitachi, Ltd., Tokyo, Japan

[21] Appl. No.: 150,504

[22] Filed: Feb. 1, 1988

Related U.S. Application Data

[63] Continuation of Ser. No. 788,561, Oct. 17, 1985, abandoned.

[30] Foreign Application Priority Data

Oct. 17, 1984 [JP] Japan ................................ 59-216143
Feb. 15, 1985 [JP] Japan ................................ 59-26227
Mar. 25, 1985 [JP] Japan ................................ 59-58295

[51] Int. Cl.⁴ ............................................. G11B 5/127
[52] U.S. Cl. ................................................. 360/126
[58] Field of Search ....................... 360/126; 428/554

[56] References Cited

U.S. PATENT DOCUMENTS 4,404,609 9/1983 Jones ..................................... 360/126
4,593,334 6/1986 Anderson et al. ................... 360/126

Primary Examiner—Robert S. Tupper
Attorney, Agent, or Firm—Antonelli, Terry & Wands

[57] ABSTRACT

Multilayered magnetic films of the invention comprising at least two unit magnetic films each of which has a thickness of from 0.05 to 0.9 μm and includes a plurality of ferromagnetic layers each having a thickness of from 0.01 to 0.2 μm and a 1 nm to 10 nm thick first intermediate layer consisting of a ferromagnetic, nonmagnetic or antiferromagnetic material and provided between adjacent ferromagnetic layers, and a second intermediate layer having a thickness of from 10 to 40 nm, consisting of a nonmagnetic or antiferromagnetic material and provided between the at least two unit magnetic films. The multilayered magnetic film is suitable as a pole of a thin-film magnetic head. An underlayer may be further provided between the magnetic film and a substrate whereby a multilayered magnetic film having good characteristics can be obtained.

18 Claims, 9 Drawing Sheets

MULTILAYERED MAGNETIC FILMS AND THIN-FILM MAGNETIC HEADS USING THE SAME AS A POLE

This application is a continuation of application Ser. No. 788,561, filed Oct. 17, 1985, now abandoned.

BACKGROUND OF THE INVENTION

1. Field of the Invention

This invention relates to magnetic films having a high permeability in a high frequency range and a low coercive force and more particularly, to multilayered magnetic films which can maintain a high permeability even when processed in the form of a pole and have good magnetic characteristics. The invention also relates to high performance thin-film magnetic heads using the multilayered magnetic films.

2. Description of the Prior Art

For the improvement of high frequency characteristics of magnetic films, there is known a method in which magnetic layers are deposited through a nonmagnetic intermediate layer such as $SiO_2$. As particularly described in Japanese Laid-open Patent Publication No. 58-192311, it is known that with known multilayered magnetic films such as, for example, a multilayered magnetic film in which Fe-Si layers are superposed through an intermediate layer of a nonmagnetic material such as $SiO_2$, the grain size of Fe-Si itself becomes smaller by the superposition, so that the dispersion of the anisotropy is suppressed, leading to an improvement of magnetic characteristics of the resultant film. In this case, the thickness is generally in the range of from 0.01 to 0.2 μm for the magnetic films and in the range of from 1 nm to 10 nm for the intermediate layer. This is because when the thickness of the intermediate layer is in the order of several nm, pin holes are essentially present, so that the exchange interaction between the Fe-Si layers are induced through the pin holes and thus the respective layers couple ferromagnetically while suppressing the dispersion of the anisotropy. As a consequence, the film has good magnetic characteristics as a whole.

On the other hand, in order to improve the high frequency characteristics of the multilayered magnetic films, it is necessary to reduce an eddy current loss in the high frequency range. In Japanese Laid-open Patent Publication No. 59-9905 (1984), an attempt was made to improve the high frequency characteristics of the multilayered film by superposing the magnetic layers through a thicker nonmagnetic insulative layer. For improving the high frequency characteristics, it is stated to be desirable that the thickness of the nonmagnetic intermediate layer ranges from 0.05 to 1 μm. However, when such multilayered film is patterned in the form of a pole for application to a thin-film magnetic head, the permeability at 10 MHz lowers to about 1/10 time the permeability of the initial film prior to the patterning. Thus, good head characteristics cannot be obtained.

SUMMARY OF THE INVENTION

It is an object of the present invention to provide multilayered magnetic films which overcome the above prior problems and have a high permeability in a high frequency range with a low coercive force.

It is another object of the invention to provide a thin-film magnetic head which makes use of the above-mentioned multilayered magnetic film as a pole.

The present invention is accomplished based on the following findings.

In known multilayered magnetic films, the individual layers couple ferromagnetically, so that the direction of magnetization cannot be changed along the film thickness. When this type of multilayered magnetic film is applied to a thin-film magnetic head and patterned in the form of a magnetic core, the influence of the demagnetizing field at the end of the core is reduced, so that the direction of magnetization in the plane is controlled. On observation of the Bitter pattern at the pole, a triangular magnetic domain as shown in FIG. 1 is formed, causing the pole not to be formed at the end of the magnetic core. Within the inside of the triangular magnetic domain, the axis of easy magnetization is turned toward the direction of the magnetic flux path of the magnetic core. Especially, when the core is energized at a high frequency or a record signal is read, the response in the inside becomes slow, with the result that an effective permeability lowers as a whole of the pole. Thus, the recording and reproducing characteristics of the head apparently lower.

The above phenomenon becomes more pronounced at a larger saturation flux density Bs of a magnetic material and thus presents a more serious problem.

We made extensive studies of various film structures and theoretical analyses in order to solve the above problem. As a result, we succeeded in making multilayered films of magnetic materials having a high Bs value, which has good permeability even after patterning. In order to improve magnetic characteristics of a ferromagnetic thin film after patterning, at least two unit magnetic films in which ferromagnetic material layers are superposed through an intermediate layer, are further superposed through a different intermediate laer having a thickness of 10 nm to 40 nm. The at least two intermediate layers should preferably consist of different types of materials including ferromagnetic, nonmagnetic and antiferromagnetic materials. Since the unit magnetic films are further superposed through the second intermediate layer, the permeability does not deteriorate even after processing the film into a finer pattern. As described in IEEE Trans., Magn., Vol. 1, Mag-13, pp. 1521–1523, Ni-Fe magnetic films are superposed through a 10 nm thick intermediate layer of Cu with similar results. In the practice of the invention, however, the intermediate layers are made of at least two different types of materials, so that the effect becomes more pronounced than in the prior art case.

FIG. 2 shows the results of a comparison between a magnetic film having two different intermediate layers and a magnetic film having only one intermediate layer with respect to permeability. FIG. 2 shows the relation between the permeability and the pattern width, in which the curves A and B are, respectively, for unit magnetic films which comprise a five-layered magnetic film having 0.1 μm thick 7 wt% Si-Fe layers and 3 nm thick first intermediate layers having a thickness of 3 nm. The magnetic materials may be, instead of Si-Fe, Co-Fe, Fe-Ti, Co-Zr or Co-ZrMo. The first intermediate layer may be made of ferromagnetic materials such as Ni, Fe, Co and $Fe_2O_3$, or antiferromagnetic materials such as NiO, Mn-Fe and the like, with similar results. The Fe-Si magnetic material layer should preferably have a thickness of from 0.01 to 0.2 μm, more preferablyfrom 0.04 to 0.12 μm, as shown in FIG. 3. This is because if the magnetic film thickness is less than 0.01 μm, the magnetic characteristics such as thermal stress tend to deteriorate. On the other hand, when the thickness exceeds 0.2 μm, the grain size undesirably increases and thus the magnetic characteristics deteriorate. The unit magnetic films are superposed through a second intermediate layer of $SiO_2$ having a thickness of 20 nm. Similar results are obtained when there are used, instead of $SiO_2$, $Al_2O_3$, Ti, Mo, W and the like. The thickness of the first intermediate layer is in the range of from 1 to 10 nm, preferably from 2 to 8 nm as will be seen from FIG. 4. This is because when the thickness is less than 1 nm, the quality of the intermediate layer is poor and the crystal grains grow through the pin holes, so that the magnetic characteristics deteriorate. On the other hand, when the thickness exceeds 10 nm, the magnetization of the respective magnetic layers is reversed, so that magnetic characteristics deteriorate. Moreover, the second intermediate layer has generally a thickness of from 10 to 40 nm, preferably from 15 to 30 nm, as will be seen from FIG. 5. When the thickness is less than 10 nm, the interaction between the respective unit magnetic layers is so strong that the directions of magnetization of the respective layers become the same, thus leading to deterioration of magnetic characteristics after patterning.

As will be seen from the above, the directions of magnetization of adjacent unit ferrogmagnetic layers or films of the multilayered magnetic film according to the invention are opposite to each other. Even though a free pole is produced at the end of the magnetic core, a free pole of a opposite polarity exists near the core end, so that an increase of magnetostatic energy is very small. Accordingly, it is unnecessary to form triangular magnetic domains 2,4 shown in FIG. 1. This effect is more remarkable when the total of unit magnetic films is an even number for the same thickness on taking the compensating effect of the free pole into consideration. In this manner, the deterioration of magnetic characteristics can be prevented as shown in FIG. 2 even when the magnetic film is shaped into a magnetic core form.

As will be appreciated from the foregoing, the above effect becomes greater on a magnetic film making use of a ferromagnetic material which tends to form a magnetic domain structure by paterning and whose saturation magntic flux density is not less than 1.2 T, preferably not less than 1.5 T. This becomes more remarkable when the thickness of the unit magnetic film is in the range of from 0.05 to 0.9 μm, preferably 0.09 to 0.2 μm. In view of the reproducibility and reliability, it is preferred to use Fe-Si or Fe-Si-Ru as the ferromagnetic material, Ni-Fe alloy as the first intermediate layer, and $SiO_2$ or $Al_2O_3$ as the second intermediate layer.

The multilayered films of the invention have good magnetic characteristics when patterned in the form of a pole. The thin-film magnetic head using the film has much better characteristics by at least two times than thin-film heads of other constructions. Especially, when the multilayered film is used as a main pole of the thin-film head, this head is very suitable as a head for vertical magnetic recording since the magnetic characteristics of the thin film do not deteriorate.

DETAILED DESCRIPTION AND PREFERRED EMBODIMENTS OF THE INVENTION

Figure 1:
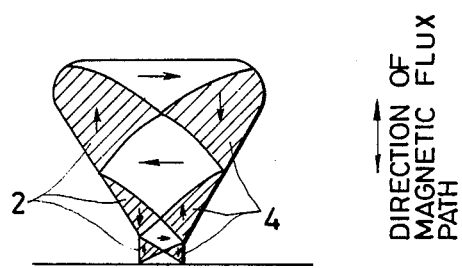
FIG. 1 is a magnetic domain pattern of a known multilayered magnetic film which has been patterned in the form of a pole.
Figure 2:
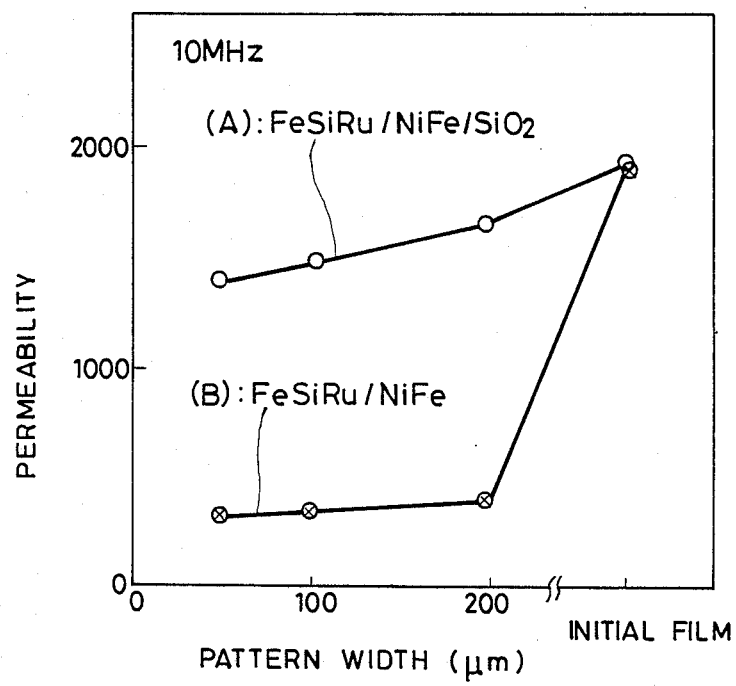
FIG. 2 is a graphical representation of the relation between permeability and pattern width of a multilayered film, after being patterned in the form of a pole, of the invention in comparison with a known multilayered film.
Figure 3:
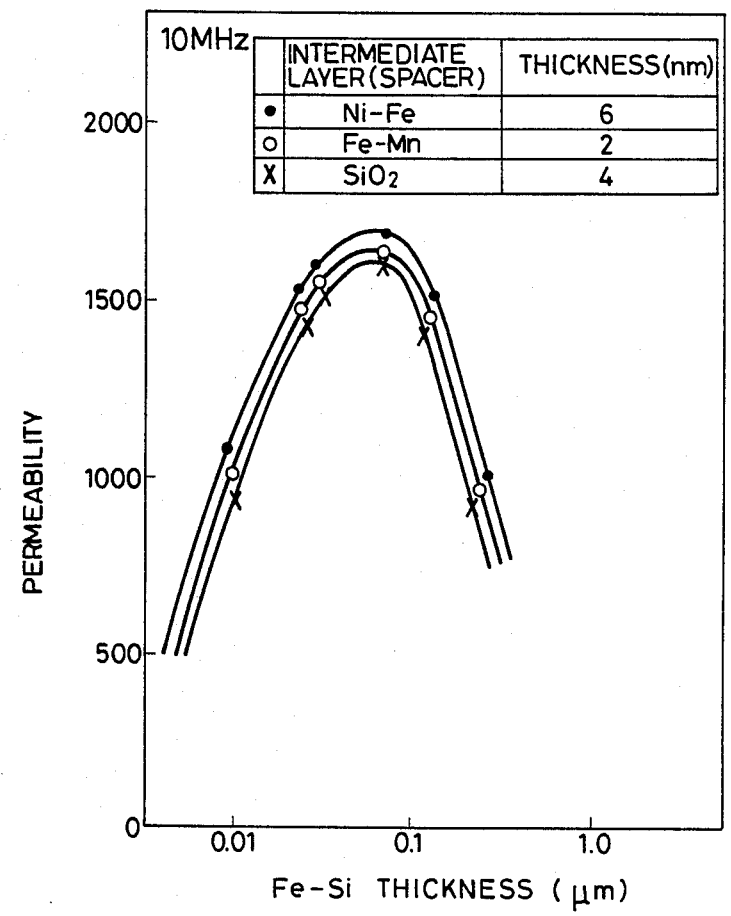
FIG. 3 is a graphical representation of the thickness dependence of permeability of a multilayered magnetic film of the invention.
Figure 4:
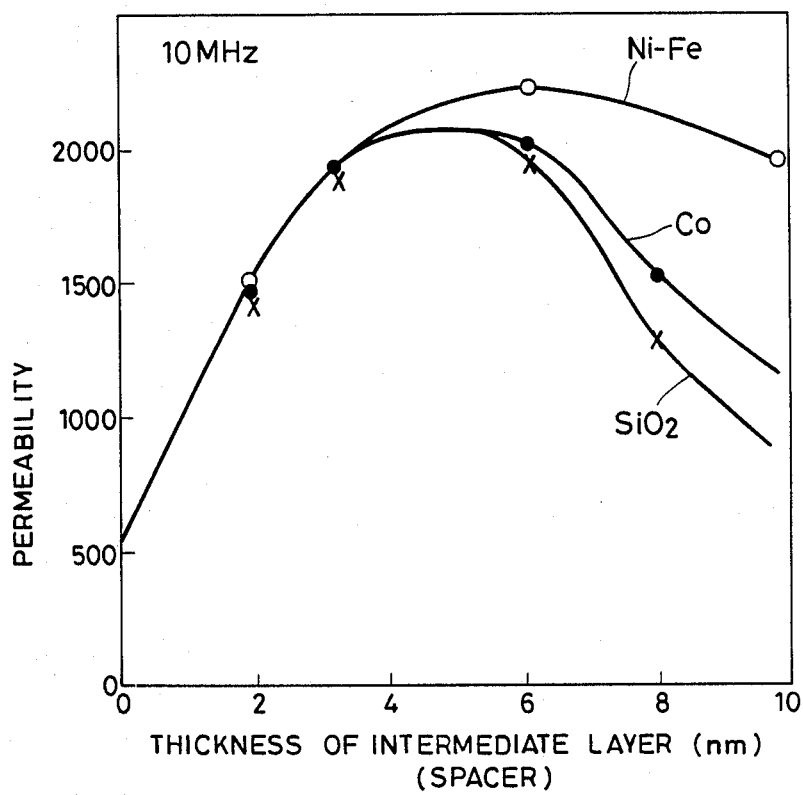
FIG. 4 is a graphical representation of the dependence of permeability on the thickness of a first intermediate layer in a multilayered magnetic film acccording to the invention.
Figure 5:
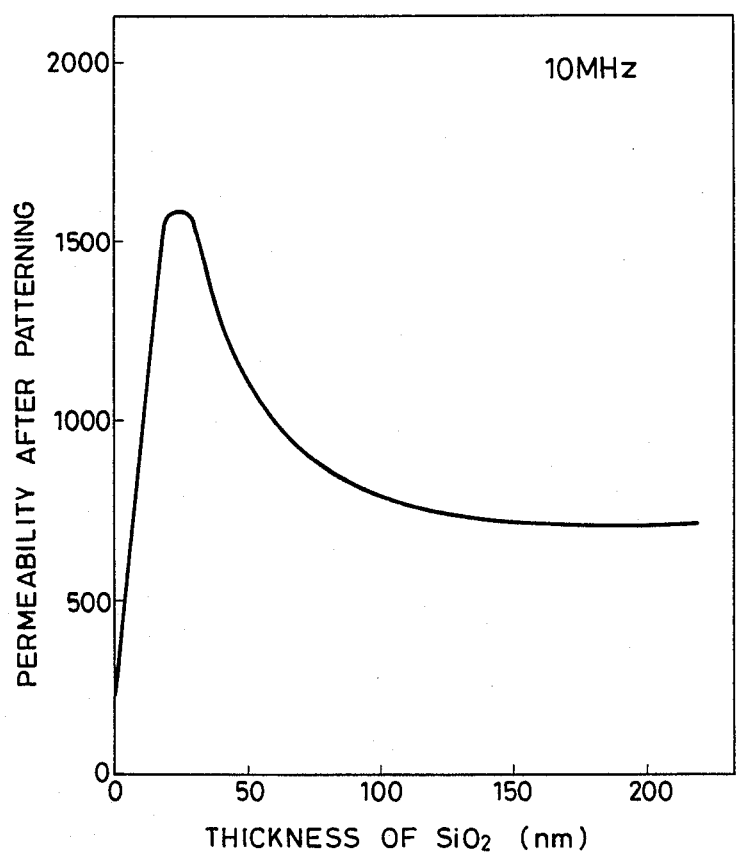
FIG. 5 is a graphical representation of the dependence of permeability of a multilayered magnetic film of the invention on the thickness of a second intermediate layer.
Figure 6:
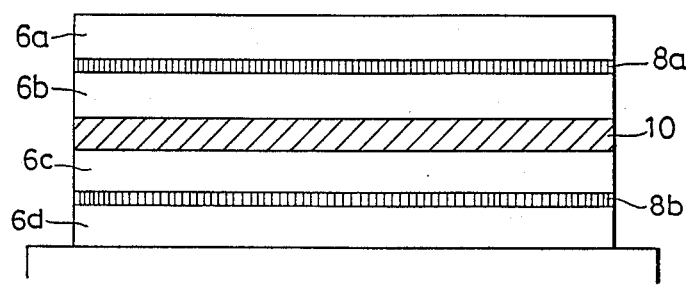
FIGS. 6 and 7 are, respective, schemative views of multilayered magnetic films according to the invention.

Reference is now made to FIG. 6, which shows one embodiment of a multilayer structure of a multilayered magnetic film of the invention. The multilayered magnetic film includes main magnetic material layers 6a, 6b, 6c, 6d, first intermediate layers 8a, 8b keeping ferromagnetic coupling between the respective main magnetic material layers, and a second intermediate layer 10 prohibting the ferromagnetic coupling between the main magnetic layer halves. The main magnetic materials for the layers 6a, 6b, 6c, 6d, which have a high saturation magnetic flux density, include Fe-Si alloys, Fe-Ge alloys, Fe-Ti alloys, Fe-N alloys, Co-Fe alloys Co-Zr alloys, Co-Ti alloys, Co-Ta alloys and the like. From the standpoint of the saturation magnetic flux density, Fe-base alloys are preferred. The first intermediate layers 8a, 8b may be made of ferromagnetic materials such as Ni-Fe alloys, Co and the like, non-magnetic materials such as $SiO_2$, $Al_2O_3$, Al, Ti, Mo and the like, and antiferromagnetic materials such as Fe-Mn alloys. Particular examples of the magnetic layer and the first intermediate layer are shown in Table 1. These layers may be formed by sputtering, vacuum deposition or the like techniques, When the intermediate layer is formed of a non-magnetic material, the magnetic layer may be oxidized on the surface thereof by introducing oxygen into a sputtering apparatus.

intermediate layer 18 should preferably be larger than the first intermediate layers 8a, 8b in order to cut off the ferromagnetic coupling between the magnetic films formed through the second layer 18. In this sense, the thickness is preferably in the range of from 10 to 40 nm,

TABLE 1-1

| | (1) Thickness (μm) | Material | (2) Thickness (μm) | Material | (3) Thickness (μm) | Material |
|---|---|---|---|---|---|---|
| | | | Magnetic Layer: | | | |
| 11 | 0.05 | Fe—6%Si—1%Ru | 0.1 | Fe—8%Si—2%Ru | 0.07 | Fe—7%Si—3%Ru |
| 12 | 0.05 | Fe—6%Si—1%Ru | 0.05 | Fe—8%Si—2%Ru | 0.1 | Fe—7%Si—3%Ru |
| 13 | 0.05 | Fe—6%Si—1%Ru | 0.05 | Fe—8%Si—2%Ru | 0.07 | Fe—7%Si—3%Ru |
| 14 | 0.05 | Fe—6%Si—1%Ru | 0.1 | Fe—8%Si—2%Ru | 0.1 | Fe—7%Si—3%Ru |
| | | | Intermediate Layer: | | | |
| 15 | 0.05 | Ni—20%Fe | 0.006 | Ni—17%Fe | 0.003 | Co |
| 16 | 0.05 | Ni—20%Fe | 0.004 | Ni—17%Fe | 0.005 | Co |
| 17 | 0.02 | SiO$_2$ | 0.03 | Al$_2$O$_3$ | 0.015 | SiO$_2$ |

TABLE 1-2

| | (4) Thickness (μm) | Material | (5) Thickness (μm) | Material | (6) Thickness (μm) | Material |
|---|---|---|---|---|---|---|
| | | | Magnetic Layer: | | | |
| 11 | 0.04 | Fe—8%Si—5%Ru | 0.4 | Fe—7%Si—8%Ru | 0.04 | Fe—5%Si—15%Ru |
| 12 | 0.06 | Fe—8%Si—5%Ru | 0.4 | Fe—7%Si—8%Ru | 0.04 | Fe—5%Si—15%Ru |
| 13 | 0.04 | Fe—8%Si—5%Ru | 0.5 | Fe—7%Si—8%Ru | 0.04 | Fe—5%Si—15%Ru |
| 14 | 0.06 | Fe—8%Si—5%Ru | 0.5 | Fe—7%Si—8%Ru | 0.15 | Fe—5%Si—15%Ru |
| | | | Intermediate Layer: | | | |
| 15 | 0.003 | Ni—18.5%Fe | 0.003 | SiO$_2$ | 0.003 | Fe—Mn |
| 16 | 0.003 | Ni—18.5%Fe | 0.003 | SiO$_2$ | 0.003 | Fe—Mn |
| 17 | 0.020 | Ti | 0.005 | Fe—Mn | 0.02 | SiO$_2$ |

The thicknesses of the main magnetic material layers 6a, 6b, 6c, 6d should preferably be in the range of from 0.01 μm to 0.2 μm, most preferably from 0.04 to 0.12 μm, in which a smaller grain size can be achieved. As described before, the thickness of the first intermediate layers 8a, 8b should preferably be in the range of from 1 to 10 nm, most preferably from 2 to 8 nm, in order to ensure good ferromagnetic coupling of the magnetic layers through the intermediate layer. When a nonmagentic film is used as the first intermediate layers 8a, 8b, it is preferred to make a smaller thickness than in the case using a magnetic film. The thickness of the second most preferably from 15 to 30 nm.

When the unit magnetic film including two magnetic films and the first intermediate layer 8a or 8b formed between the magnetic films, is too thick, an adverse influence of the demagnetizing field appears. To avoid this, the thickness is preferably in the range of from 0.05 to 0.9 μm, most preferably from 0.09 to 0.2 μm.

Figure 7:
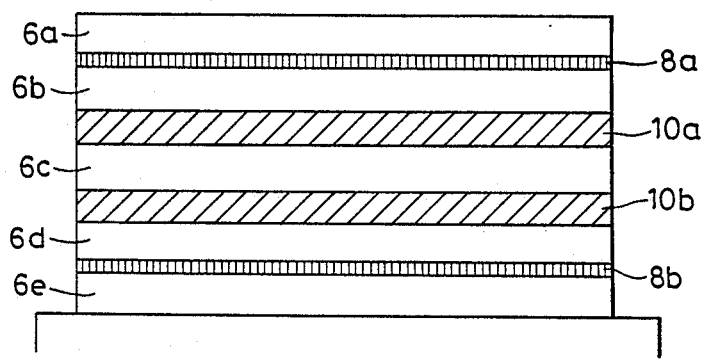

The number of the unit magnetic films is preferred to be even as shown in FIG. 6. However, an odd number of the unit magnetic film may be used as in FIG. 7.

In Table ;b 2, there are shown further examples of the magnetic layer and the intermediate layer.

TABLE 2-1

| | (1) Thickness (μm) | Material | (2) Thickness (μm) | Material | (3) Thickness (μm) | Material |
|---|---|---|---|---|---|---|
| | | | Magnetic Layer: | | | |
| 21 | 0.05 | Fe—6%Si—1%Ru | 0.1 | Fe—8%Si—2%Ru | 0.07 | Fe—7%Si—3%Ru |
| 22 | 0.05 | Fe—6%Si—1%Ru | 0.05 | Fe—8%Si—2%Ru | 0.07 | Fe—7%Si—3%Ru |
| 23 | 0.05 | Fe—6%Si—1%Ru | 0.05 | Fe—8%Si—2%Ru | 0.1 | Fe—7%Si—3%Ru |
| 24 | 0.05 | Fe—6%Si—1%Ru | 0.05 | Fe—8%Si—2%Ru | 0.07 | Fe—7%Si—3%Ru |
| 25 | 0.05 | Fe—6%Si—1%Ru | 0.1 | Fe—8%Si—2%Ru | 0.1 | Fe—7%Si—3%Ru |
| | | | Intermediate Layer: | | | |
| 26 | 0.005 | Ni—20%Fe | 0.003 | Ni—17%Fe | 0.003 | Co |
| 27 | 0.03 | SiO$_2$ | 0.003 | Fe—Mn | 0.03 | SiO$_2$ |
| 28 | 0.03 | SiO$_2$ | 0.02 | Fe—Mn | 0.015 | SiO$_2$ |
| 29 | 0.005 | Ni—20%Fe | 0.005 | Ni—17%Fe | 0.003 | Co |

TABLE 2-2

| | (4) Thickness (μm) | Material | (5) Thickness (μm) | Material | (6) Thickness (μm) | Material |
|---|---|---|---|---|---|---|
| | | | Magnetic Layer: | | | |
| 21 | 0.04 | Fe—8%Si—5%Ru | 0.08 | Fe—7%Si—8%Ru | 0.04 | Fe—5%Si—15%Ru |
| 22 | 0.06 | Fe—8%Si—5%Ru | 0.05 | Fe—7%Si—8%Ru | 0.05 | Fe—5%Si—15%Ru |
| 23 | 0.04 | Fe—8%Si—5%Ru | 0.07 | Fe—7%Si—8%Ru | 0.05 | Fe—5%Si—15%Ru |

TABLE 2-2-continued

| | (4) Thickness (μm) | Material | (5) Thickness (μm) | Material | (6) Thickness (μm) | Material |
|---|---|---|---|---|---|---|
| 24 | 0.06 | Fe—8%Si—5%Ru | 0.07 | Fe—7%Si—8%Ru | 0.05 | Fe—5%Si—15%Ru |
| 25 | 0.08 | Fe—8%Si—5%Ru | 0.05 | Fe—7%Si—8%Ru | 0.15 | Fe—5%Si—15%Ru |
| | | | | Intermediate Layer: | | |
| 26 | 0.005 | Ni—18.5%Fe | 0.003 | SiO$_2$ | 0.002 | Fe—Mn |
| 27 | 0.03 | Mo | 0.03 | Fe—Mo | 0.02 | Al$_2$O$_3$ |
| 28 | 0.04 | Mo | 0.02 | Fe—Mn | 0.03 | Al$_2$O$_3$ |
| 29 | 0.003 | Ni—18.5%Fe | 0.003 | SiO$_2$ | 0.002 | Fe—Mn |

Embodiments of thin-film magnetic heads which are fabricated by the use of the multilayered magnetic films according to the invention, ae described in detail.

Figure 8A:
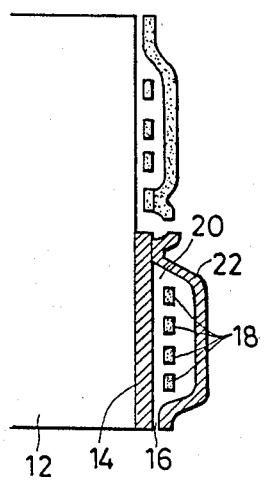
FIGS. 8a and b is a schematic sectional view of a thin-film magnetic head in which a multilayered magnetic film of the invention is applied as a pole.
Figure 8B:
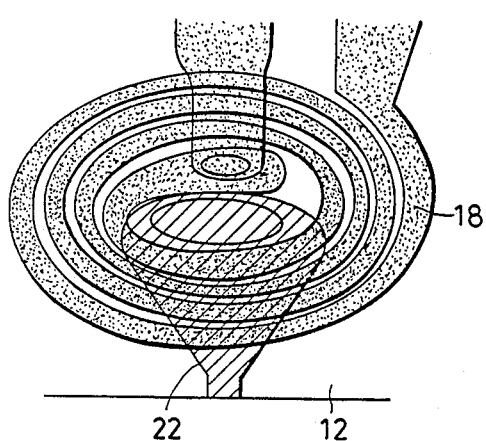

Multilayered magnetic films of such a structure a shown in FIG. 6 are fabricated in which the main material having a high saturation magnetic flux density used is a Fe-6.5 wt%Si-1 wt%Ru alloy. The first intermediate layer for ferromagnetically coupling the alloy layers consists of Ni-20 wt%Fe, and SiO$_2$ is used as a second nonmagnetic layer for cutting off the ferromagnetic coupling between the ferromagnetic layers. The Fe-6.5 wt%Si-1 wt%Ru alloy layers are set to have a constant thickness of 0.05 μm and the Ni-20 wt%Fe alloy layers have a constant thickness of 5 nm. However, the thickness of the SiO$_2$ layer is changed as 0, 5, 10, 50, 90, 100 and 150 nm. These multilayered magnetic films are used to make a thin-film magnetic head of the type shown in FIG. 8. In the figure, the magnetic head includes a nonmagnetic substrate 12 such as of Al$_2$O$_5$, TiC, Al$_2$O$_3$ or ZrO$_3$, a multilayered magnetic film 14 of the invention, a gap layer 16 consisting of Al$_2$O$_3$, SiO$_2$ or the like, a coil 18 of Cu, Al or the like, an insulative layer 20 such as of a polyimide resin or SiO$_2$, and a magnetic layer 22 such as of CoZr, Ni-Fe or the like. The layers using Fe-Si-Ru alloys, Ni-Fe alloys and SiO$_2$ are formed by high frequency sputtering.

Figure 9:
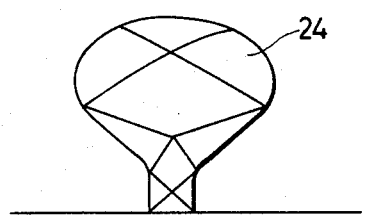
FIGS. 9 and 10 are, respectively, schematic views of triangular magnetic domains in cases where the thicknesses of a second intermediate layer are 0.5 nm and 10 nm or over, respectively.
Figure 10:
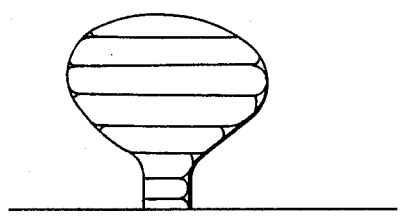

When the second intermediate SiO$_2$ layer of the multilayered magnetic film 14 has a thickness of 0.5 nm, it gives little effect as the intermediate layer. In fact, the permeability, at 10 MHz, of the magnetic film after patterning is as low as approximately 200. Upon observation of the magnetic domain structure, it is found that a very large triangular magnetic domain 24 is formed as particularly shown in FIG. 9. On the other hand, when the thickness of the second SiO$_2$ intermediate layer is 10 nm or over, the effect of SiO$_2$ develops and the permeability is as high as 1000 to 1500. The magnetic domain structure is observed as shown in FIG. 10, in which a triangular magnetic domain is not substantially formed. If the thickness of the second intermediate layer is too large, the magnetic characteristics of the initial film deteriorate with a reduction of permeability after patterning.

Figure 11:
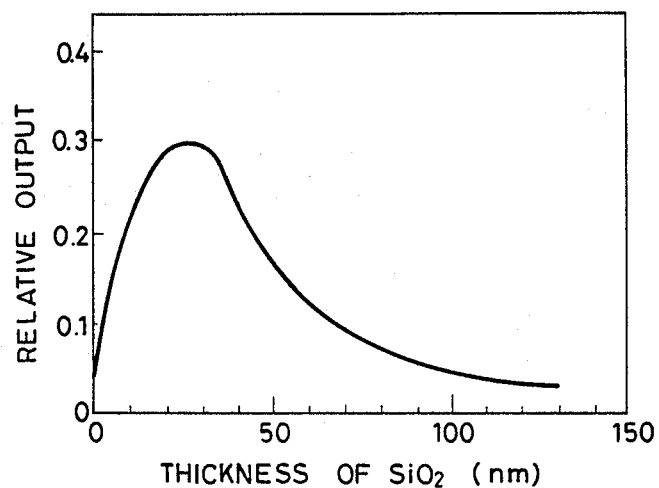
FIG. 11 is a graphical representation of the relation between thickness of an $SiO_2$ intermediate layer and relative output.

The relative output of the magentic head according to the invention is shown in FIG. 11. For this purpose, there is used a two-layered medium having a Co-Cr vertical magnetic layer which has a saturation magnetization, Ms, of 3000 emu/cc, a coercive force, Hcl, of 5000 e and a thickness, tm, of 0.2 μm and is formed on a 0.7 μm thick Co-Zr-Mo soft magnetic layer. From the figure, it will be seen that when the second intermediate layer has a thickness between 10 nm and 40 nm, good characteristics are obtained.

Figure 12:
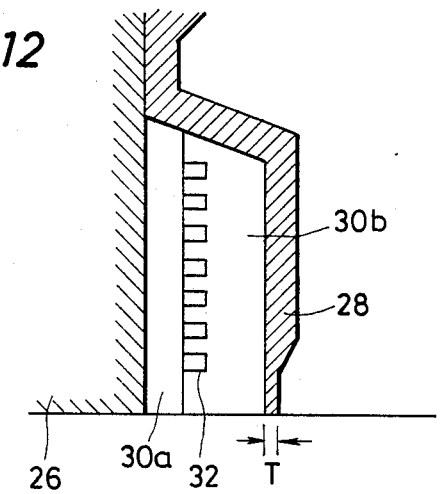
FIG. 12 is a schematic sectional view of a thin-film magnetic head using a multilayered magnetic film of the invention.
Figure 13:
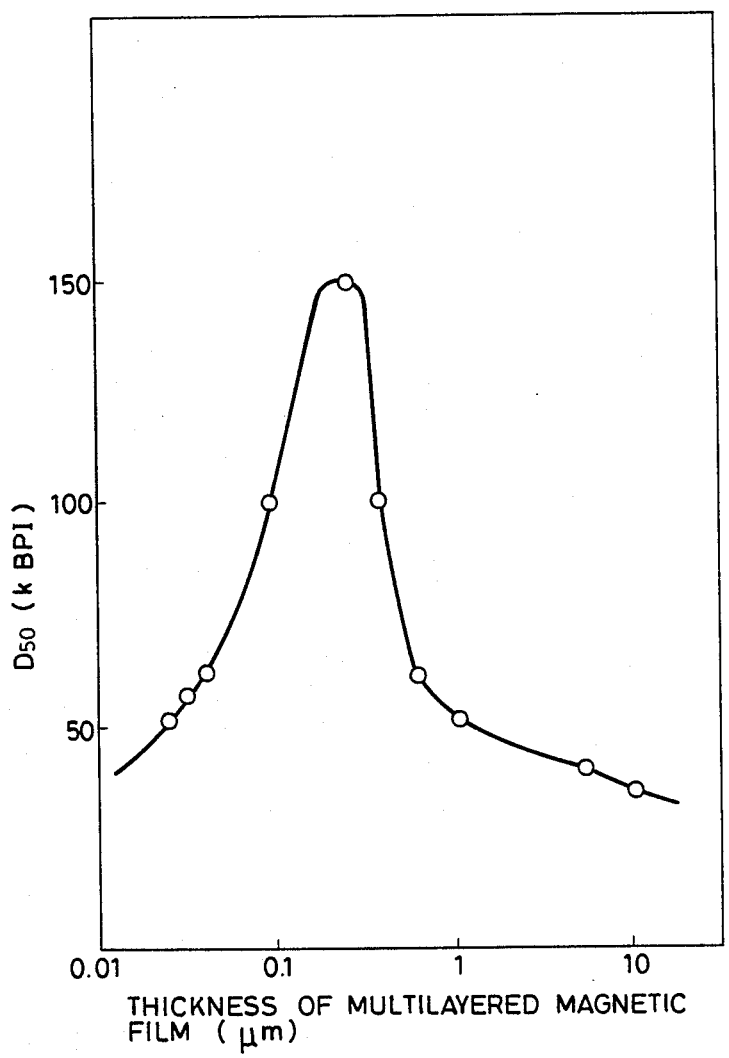
FIG. 13 is a graphical representation of the relation between thickness of a multilayered film of the invention and recording density characteristic.

FIG. 12 shows another embodiment of a thin-film magnetic head using the multilayered magnetic film of the invention. The magnetic head comprises a ferromagnetic substrate 26, a main pole 28 using the multilayered magnetic film shown in FIG. 7, a gap layer 30a made of SiO$_2$, Al$_2$O$_3$ or the like, an insulative layer 30b, and a conductive coil 32 made of Al, Cu o the like. In FIG. 13, there is shown a bit density characteristic in relation to the thickness of the multilayered magnetic film in which the thickness used is 0.02, 0.035, 0.05, 0.1, 0.3, 0.6, 1, 2, 5, and 10 μm. In this case, a two-layered medium, which has a 0.9 μm thick CoZrMo underlayer of a high permeability and a Co-Cr layer having Ms of 800 emu/cc, Hcl of 700 Oe and tm of 3 μm, is used. The results of the figure reveal that in order to increase the bit density characteristic, the total thickness is generally in the range of from 0.035 to 1 μm, preferably from 0.05 to 0.5 μm and most preferably from 0.1 to 0.4 μm. In order to prevent the magnetic saturation of the main pole, the saturation magnetic flux density should preferably be not less than 1.2 T and most preferably not less than 1.5 T. The multilayered magnetic film has a permeability of about 1500 at 10 MHz even after patterning into the main pole. Thus, the multilayered magnetic film can provide a thin-film magnetic head which has a very high reproduction sensitivity.

Thus, the multilayered magnetic film, which has such a high permeability in a high frequency range after shaping into a pole, is effectively used as a core for a thin-film magnetic head and can remarkably improve the head performance.

The above embodiments involves the first and second intermediate layers which are of different types. If different types of intermediate layers are used, different types of targets are essentially required for the formation of the film by sputtering. In this sense, if both types of intermediate layers are made of the same type of nonmagnetic material or antiferromagnetic material, the formation of the film by sputtering becomes easy.

Further embodiments of the present invention are described.

The thin-film magnetic head shown in FIG. 12 is a so-called vertical magnetic recording head, which is adapted for use in vertical magnetic recording systems. In the system, a magnetic medium having an axis of easy magnetization perpendicular to the magnetic recording medium surface is magnetically recorded in vertical directions. In this type of thin-film magnetic head, the bit density is determined depending on the thickness, T, of a soft magnetic thin film of high permeability used as the main pole 28 in FIG. 12. If the thickness, T, of the main pole decreases, the magnetic field for recording increases sharply, making it more difficult to cause recording demagnetization. As a result, a magnetic bit density increases. For instance, when a magnetic bit density is 100 kBPI, the thickness, T, of the main pole 28 should be below 0.3 μm. However, a smaller thickness, T, of the main pole results in an increase of coercive force Hc (Oe) of the magnetic thin film and a decrease of permeability, μ, thus causing the magnetic characteristics to deteriorate. This presents the problem that the magnetic recording and reproducing sensitivity of the thin-film magnetic head abruptly decreases. One of methods for preventing the deterioration of the soft magnetic characteritics involved by the thin-film formation is described in Japanese Laid-open Patent Publication No. 58-153223 (1983). In this method, the degenerated layer produced at the initial state of the soft magnetic thin film formation is removed to prevent the deterioration. Accordingly, the method is applicable only to fabrication of a thin-film magnetic head of a specific construction. In addition, the thin-film formation process is complicated with a number of steps.

We have made studies as to why coercive force, Hc (Oe), increases and permeability, μ, decreases as the thickness of a high permeability, soft magnetic thin film decreases. As a result, it was found that this had close relation with a surface roughness of a substrate on which a soft magnetic thin film was formed, foreign matters such as dust, and thermal strain caused between the substrate and the thin film. In case where a thin film of Fe-Si or Ni-Fe alloy was formed by vacuum deposition, sputtering, electrodeposition or the like, soft magnetic materials having a columnar structure had the tendency that as the thickness of the soft magnetic thin film decreased, the size of columnar grains in the thin film increased relative to the thickness. As a result, the dispersion of in-plane anisotropy of the soft magnetic thin film increased, so that coercive force, Hc, increased and permeability, u, decreased. Thus, in order to improve the magnetic characteristic of soft magnetic thin films, it is necessary that the size of columnar grains in the thin film be as small as possible in relation to the thickness.

The principle for the formation of a soft magnetic thin film having a small size of columnar grains in this embodiment is as follows: one columnar grain is formed such that an initial stage of forming a columnar structure of the thin film, atoms flying from an evaporation source deposit on a nucleus formed by aggregation of atoms on a subtrate. Accordingly, if a larger number of nuclei are formed, a larger number of columnar grains per unit area of the thin film are produced, which in turn results in a smaller size of columnar grains. This principle is utilized in this embodiment.

When an underlayer is formed on a substrate in a thickness of several nanometers by subjecting metal or alloy to vacuum deposition or sputtering, the atoms are clustered and form a nucleus at the initial stage of formation of a soft magnetic thin film. At higher temperatures of the substrate at which a thin film of a metal or alloy in a thickness of several nanometers is formed on the subtrate, the atom clusters are more likely to aggreagate separately, making it difficult to form a continuous structure. This results in an increasing number of independent nuclei and thus, a columnar grain size of the soft magnetic thin film formed on the nuclei becomes very small.

The soft magnetic thin film according to this embodiment has a small columnar grain size and good soft magnetic characteristics. This film can be readily obtained by forming, at a high substrate temperature, an underlayer of a given metal or alloy having a thickness of several nanometers so that a great number of nuclei are formed at the initial stage of formation of the soft magnetic thin film, and then superposing the soft magnetic thin film on the underlayer.

The underlayer used in this embodiment is made of at least one metal selected from the group consisting Co, Ni, Fe, Al, Ti, Mo, Cr, V, W and Cu, or an alloy comprising at least one metal. The thickness of the underlayer is preferably in the range of from 2 to 20 nm and most preferably from 3 to 10 nm. This is because with a thickness less than 2 nm, the density of the atom clusters becomes small with a reduced number of nuclei, so that the columnar grains of the soft magnetic thin film have unfavorably a large size. On the other hand, when the thickness exceeds 20 nm, the underlayer makes an ordinary metal or alloy surface, so that the atom clusters serving as the nuclei are undesirably reduced in number.

The soft magnetic layer which may be a single layer or a multilayer is made of at least one alloy which is selected from Fe-Si-Ru alloys, Ni-Fe alloys, Fe-Ge alloys, Fe-Ti alloys and Co-Fe alloys.

The thin-film magnetic head for magnetic recording according to this embodiment makes use of the soft magnetic thin film of the type described above as a pole. When the soft magnetic film is used as the main pole of the magnetic head, high output and high linear bit density can be attained.

This is particularly described by way of examples.

EXAMPLE 1

Various magnetic metals, nonmagentic metals and non-metallic materials were each used to form a 3 nm thick underlayer on a 7059 glass substrate by means of a high frequency sputtering apparatus under conditions of an Ar pressure of 2.7 Pa., a substrate temperature of 400° C. and a making power supply of 175 W. Subsequently, the above procedure was repeated except that the power supply was increased up to 500 W and Fe-6.3 wt%Si-1 wt%Ru alloy was used, thereby forming a 0.2 μm thick soft magnetic thin film on each underlayer. The coercive force Hc (Oe) and permeability μ at 10 MHz of the resultant soft magnetic thin films using various types of underlayers are shown in Table 3 below.

TABLE 3

| Underlayer | Coercive Force Hc (Oe) | Permeability (μ) |
|---|---|---|
| nil | 3 | 800 |
| Magnetic Metal: | | |
| NiFe | 1.2 | 1600 |
| Co | 1.3 | 1500 |
| Ni | 1.2 | 1600 |
| Fe | 1.4 | 1200 |
| Nonmagnetic Metal: | | |
| Al | 1.3 | 1500 |
| Ti | 1.3 | 1400 |
| Mo | 1.3 | 1400 |
| Cr | 1.7 | 1100 |
| V | 2 | 1000 |
| W | 1.4 | 1300 |
| Cu | 1.4 | 1300 |
| Nonmetal: | | |
| $SiO_2$ | 6 | 400 |
| $Al_2O_3$ | 5 | 500 |

As will be seen from the above table, irrespective of the types of underlayer material including magnetic metals such as Ni-Fe alloy, Co, Ni and Fe and nonmagnetic metals such as Al, Ti, Mo, Cr, V, W and Cu, the effect of the underlayers on the soft magnetic characteristics is remarkable. As compared with the cases where no underlayer is used or nonmetals such as $SiO_2$ and $Al_2O_3$ are used, the coercive force Hc (Oe) is reduced to about one half and the permeability μ increases by about two times or greater. Thus, the soft magnetic thin films using the metallic underlayers have good magnetic characteristics. Especially, when Ni-Fe alloy, Co, Ni, Al, Ti and Mo are used as the underlayer, the magnetic characteristics are much more improved. The soft magnetic characteristic of the magnetic thin films using the nonmetal unerlayers are poorer than those characteristics of the magnetic thin film free of any underlayer.

EXAMPLE 2

Figure 14:
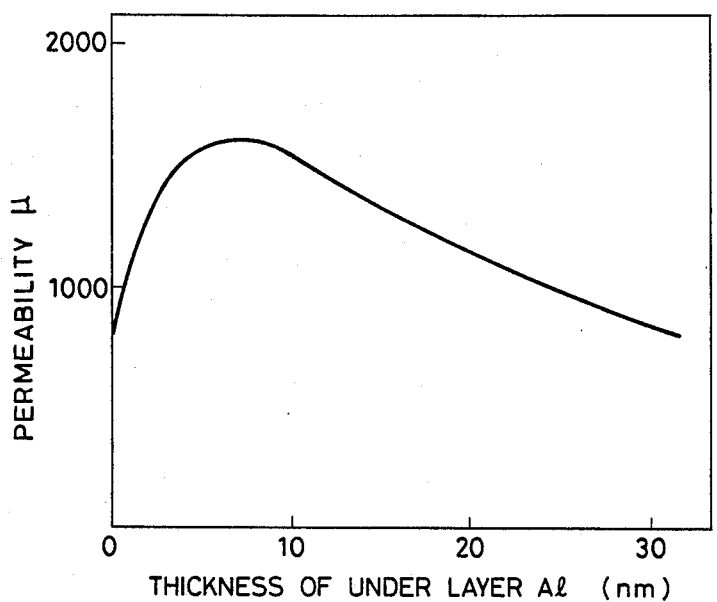
FIG. 14 is a graphical representation of the relation between thickness of an Al underlayer and permeability.

The procedure of Example 1 was repeated using an Al underlayer and a 0.2 $\mu$m thick soft magnetic thin film of Fe-6.3 wt%Si-1 wt%Ru while changing the thickness of the underlayer. The resultant films were subjected to measurement of the relation between the thickness of the underlayer and the permeability $\mu$. The results are shown in FIG. 14. As will be seen from the figure, the thickness of the underlayer is preferably from 2 to 20 nm and most preferably from 3 to 10 nm. This tendency was also confirmed when the metals and alloys other than Al were used. Within the thickness range of from 2 to 20 nm, the atoms forming the underlayer was in the form of clusters. At higher substrate temperatures, the clusters were formed as separated, not continuously, in greater numbers. It is considered that these clusters form nuclei at the initial stage of formation of the soft magnetic film, making a small size of columnar grains in the thin film.

EXAMPLE 3

Figure 15A:
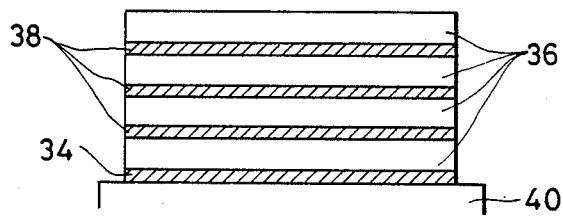
FIGS. 15a and b are sectional views illustrating a multilayered magnetic film of the invention in which an underlayer is provided between a substrate and the magnetic film.
Figure 15B:
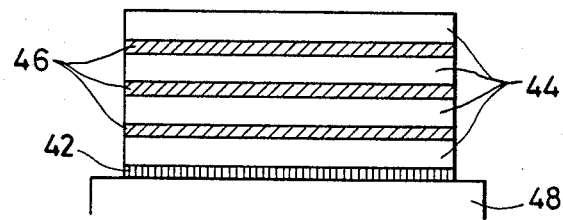

A multilayered soft magnetic thin film having a sectional structure shown in FIG. 15(a), which has an Ni-Fe alloy underlayer 34, Fe-6.3 wt%Si-1 wt%Ru alloy thin layers 36 and Ni-Fe alloy thin film intermediate layers 38 formed on a substrate 40, was made under conditions as used in Example 1. Likewise, a multilayered soft magnetic thin film having a sectional structure shown in FIG. 15(b), which has an Al underlayer 42, Fe-6.3 wt%Si-1 wt%Ru alloy thin layers 44 and Ni-Fe alloy thin film intermediate layers 46 formed on a subtrate 48, was made. The thickness of the Fe-6.3 wt%Si-1 wt% alloy thin films 36 and 44 was 0.05 $\mu$m, the thickness of the intermediate layers 38 and 46 was 3 nm, and the thickness of the underlayers 34, 42 was 3 nm. The total thickness of the multilayered soft magnetic thin film was 0.2 $\mu$m.

In this example, the underlayers were effective and had a coercive force Hc (Oe) smaller by one half and a permeability u higher by about two times that the case where no underlayer was used. Similar results were obtained when using Ti, Mo, Co, Ni and Fe as the underlayer.

The effect of the underlayer was shown not only with the case where an Fe-Si-Ru alloy single film having the columnar structure or a multilayered soft magnetic thin film having a superposed structure of Fe-Si-Ru and Ni-Fe alloys, but also with Fe-Ge, Fe-Ti and Co-Fe alloys having the columnar structure. The effect became more pronounced in Fe-Si-Ru alloys. In addition, the effect of the underlayer was remarkable when the thickness of the soft magnetic thin film was below 1 $\mu$m.

EXAMPLE 4

Figure 16:
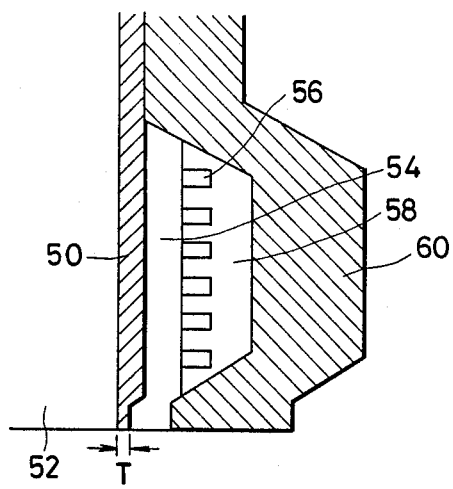
FIG. 16 is a schematic sectional view of a thin-film magnetic head using the multilayered magnetic film of the invention as a main pole.
Figure 17:
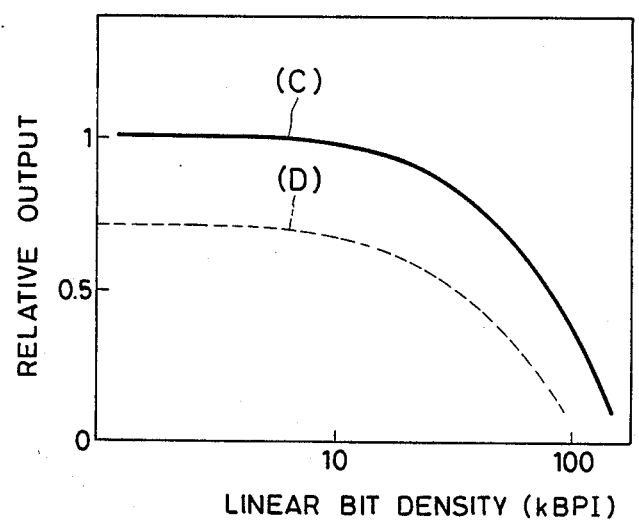
FIG. 17 is a graphical representation of the relation between linear bit density and relative output in cases where an underlayer is present and absent.

A thin-film head for vertical magnetic recording having a sectional construction shown in FIG. 16 was made according to a known thin-film formation technique, in which there was used, as a main pole 50, a 0.2 $\mu$m thick multilayered soft magnetic thin film having a 3 nm Ni-Fe alloy underlayer, Fe-6.3 wt%Si-1 wt%Ru alloy thin layers and Ni-Fe alloy intermediate layers. This thin-film magnetic head was comprised of a nonmagnetic substrate 52 made of $Al_2O_5$, TiC, $Al_2O_3$ or $ZrO_3$, the main pole 50 of the multilayered thin film construction, a gap layer 54 made of $Al_2O_3$, $SiO_2$ or the like, a conductive coil 56 made of Cu, Al or the like, an insulative laer made of polyamide resin or $SiO_2$, and an auxiliary pole 60 made of Co-Zr-W, Co-Zr, Ni-Fe or the like. The thin-film magnetic head as shown in FIG. 16 and a thin-film magnetic head whose main pole was free of any underlayer were made and compared with each other with respect to linear bit density characteristic. The results are shown in FIG. 17. As will be apparent from the figure, when a 3 nm thick Ni-Fe thin film was formed as the underlayer (curve C), the relative output and linear bit density were higher by about 1.5 times and about 1.2 times than those characteristics of the case using no underlayer (curve D), respectively.

The results of Examples 1 through 4 reveal that soft magnetic thin films which do not involve an increase of coercive force Hc (Oe) and only a slight degree of reduction of permeability when the thickness decreases, can be obtained and that thin-film magnetic heads for vertical magnetic recording using the thin films can provide high output and high linear bit density. Thus, these films and heads can have very high industrial merits.

What is claimed is:

1. In a thin-film magnetic head comprising a nonmagnetic substrate having a major surface over which a main pole, a coil and a magnetic layer are formed, at least a portion of said main pole and said magnetic layer being separated by at least a gap layer, and said coil being located between and insulated from said main pole and said magnetic layer, the improvement characterized in that said main pole consists of a multilayered magnetic film which comprises at least two unit magnetic films provided substantially parallel to said major surface of said substrate, each of said at least two unit magnetic films having a thickness of from 0.05 to 0.9 $\mu$m and comprising a plurality of ferromagnetic layers each having a thickness of from 0.01 to 0.2 $\mu$m and at least one first intermediate layer made of a ferromagnetic, nonmagentic or antiferromagnetic material having a thickness of from 1 to 10 nm provided between selected ones of said plurality of ferromagnetic layers, and at least one second intermediate layer made of a 10 to 40 nm thick nonmagnetic or antiferromagnetic material provided between the at least two unit magnetic films, wherein said plurality of ferromagnetic layers, said at least one first intermediate layer and said at least one second intermediate layer are provided substantially parallel to said major surface of said substrate.

2. A thin-film magnetic head according to claim 1, wherein each of said at least two unit magnetic films has a thickness of from 0.09 to 0.2 $\mu$m.

3. A thin-film magnetic head according to claim 1, wherein each of said plurality of ferromagnetic layers has a thickness of 0.04 to 0.12 $\mu$m.

4. A thin-film magnetic head according to claim 1, wherein said at least one first intermediate layer has a thickness of from 2 to 8 nm.

5. A thin-film magnetic head according to claim 1, wherein said at least one second intermediate layer has a thickness of from 15 to 30 nm.

6. A thin-film magnetic head according to claim 1, wherein said ferromagnetic layers are made of a material selected from the group consisting of an Fe-Si alloy and an Fe-Si-Ru alloy.

7. A thin-film magnetic head according to claim 1, wherein said at least one first intermediate layer is made of a Ni-Fe alloy.

8. A thin-film magnetic head according to claim 1, wherein said at least one second intermediate layer is made of a material selected from the group consisting of $SiO_2$ and $Al_2O_3$.

9. A thin-film magnetic head according to claim 1, wherein an underlayer made of a metal or alloy is provided on and parallel to said major surface of said substrate and said main pole, said coil and said magnetic layer are formed on said underlayer.

10. A thin-film magnetic head according to claim 9, wherein said underlayer has a thickness of from 2 to 20 nm.

11. A thin-film magnetic head according to claim 9, wherein said underlayer has a thickness of from 3 to 10 nm.

12. A thin-film magnetic head according to claim 9, wherein said underlayer is made of at least one metal selected from the group consisting of Co, Ni, Fe, Al, Ti, Mo, Cr, V, W and Cu.

13. A thin-film magnetic head for magnetic recording comprising a substrate having a major surface, an underlayer formed on and parallel to said major surface of said substrate, a first pole made of a soft magnetic thin film formed on and parallel to said underlayer, a coil and a second pole, at least a portion of said first and second poles being separated by a gap layer, said coil being located between and insulated from said first and second poles, and said underlayer being made of a metal or alloy and having a thickness of from 2 to 20 nm.

14. A thin-film magnetic head according to claim 13, wherein said soft magnetic thin film has a multilayer structure.

15. A thin-film magnetic head according to claim 13, wherein said first pole is a main pole of a thin-film magnetic head for vertical magnetic recording.

16. A thin-film magnetic head according to claim 13 or 15, wherein the underlayer is made of a metal selected from the group consisting of Co, Ni, Fe, Al, Ti, Mo, Cr, V, W, Cu and mixtures thereof and alloys comprising at least one metal defined above.

17. A thin-film magnetic head according to claim 13 or 15, wherein said soft magnetic thin film is made of at least one alloy having a columnar structure and selected from the group consisting of Fe-Si-Ru alloys, Ni-Fe alloys, Fe-Ge alloys, Fe-Ti alloys and Co-Fe alloys.

18. A thin-film magnetic head according to claim 13 or 15, wherein said underlayer has a thickness of from 3 to 10 nm.

* * * * *